United States Patent [19]

Baur et al.

[11] Patent Number: 4,774,639

[45] Date of Patent: Sep. 27, 1988

[54] HEADLIGHT FOR POWER VEHICLE

[75] Inventors: Eberhard Baur, Burladingen; Walter Weber, Reisensburg, both of Fed. Rep. of Germany

[73] Assignee: Robert Bosch GmbH, Stuttgart, Fed. Rep. of Germany

[21] Appl. No.: 865,542

[22] Filed: May 20, 1986

[30] Foreign Application Priority Data

Jul. 18, 1985 [DE] Fed. Rep. of Germany ....... 3525618

[51] Int. Cl.$^4$ ............................................. B60Q 1/00
[52] U.S. Cl. .................................... 362/66; 362/287; 362/419
[58] Field of Search ................. 362/66, 269, 287, 270, 362/275, 418, 419, 421–424

[56] References Cited

U.S. PATENT DOCUMENTS

| 4,186,427 | 1/1980 | Ishikawa et al. | 362/66 |
| 4,516,191 | 5/1985 | Moriyama et al. | 362/66 X |
| 4,524,407 | 6/1985 | Igura | 362/66 |
| 4,574,334 | 3/1986 | Igura | 362/66 |
| 4,578,740 | 3/1986 | Krizmanic | 362/66 |

FOREIGN PATENT DOCUMENTS

| 2217831 | 5/1979 | Fed. Rep. of Germany . | |
| 3028700 | 2/1982 | Fed. Rep. of Germany | 362/66 |
| 2109082 | 5/1983 | United Kingdom | 362/66 |

Primary Examiner—Margaret A. Focarino
Attorney, Agent, or Firm—Michael J. Striker

[57] ABSTRACT

A headlight for a power vehicle, comprises a housing mountable on a body of a vehicle, a frame which supports a reflector and is arranged in the housing, the frame being turnable in a horizontal and a vertical direction, a unit for turning the frame in the horizontal and the vertical direction and including a rotary part axially secured in the housing, a turning part articulately connectable with the reflector, and a deflecting mechanism which couples the parts with one another, the deflecting mechanism including a cable shaft and an angular transmission.

14 Claims, 2 Drawing Sheets

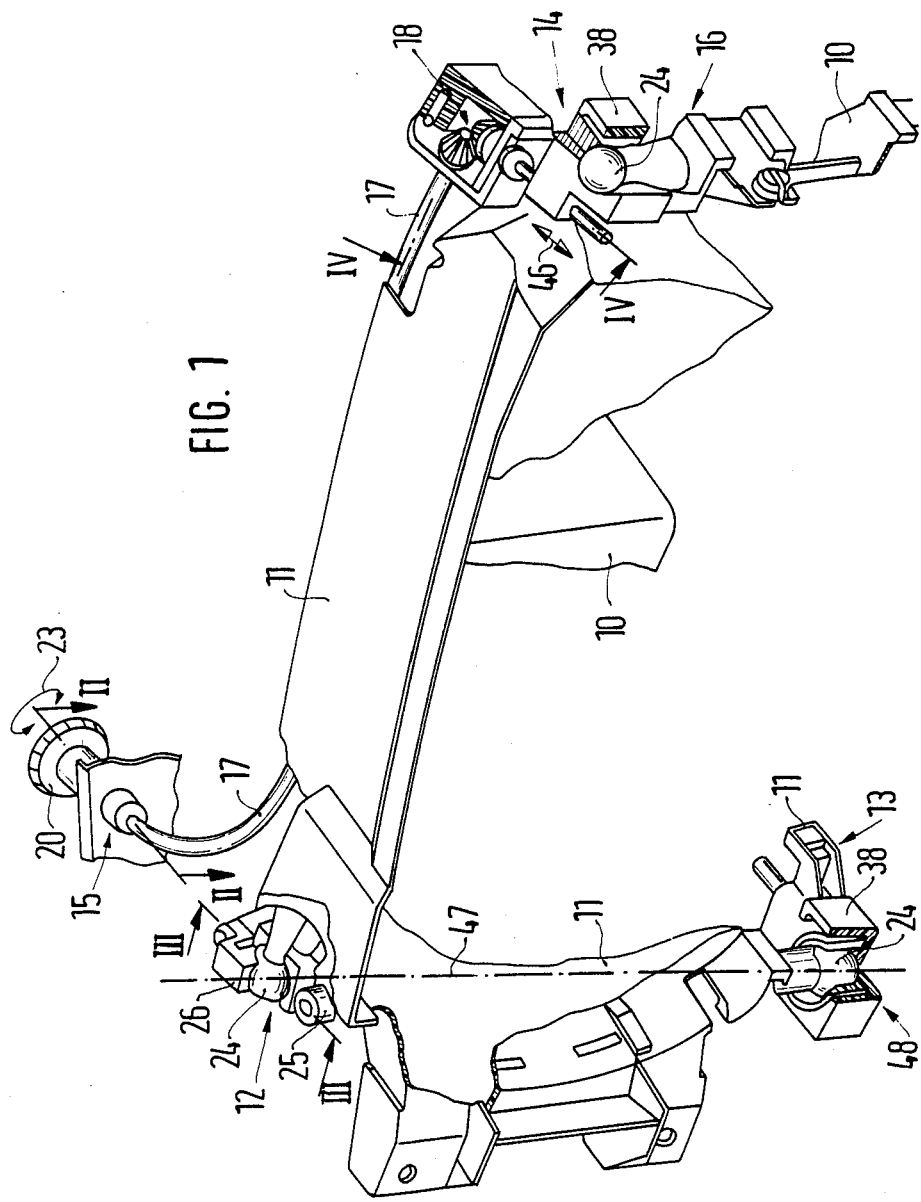

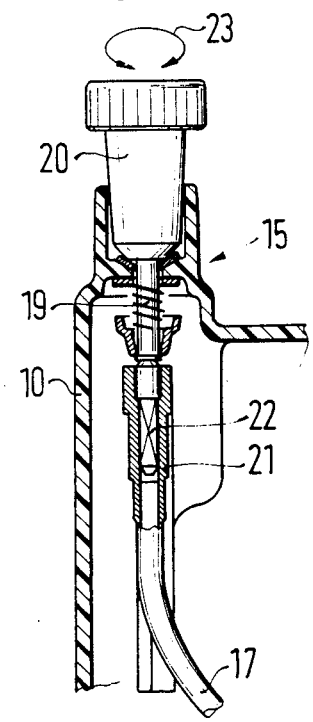
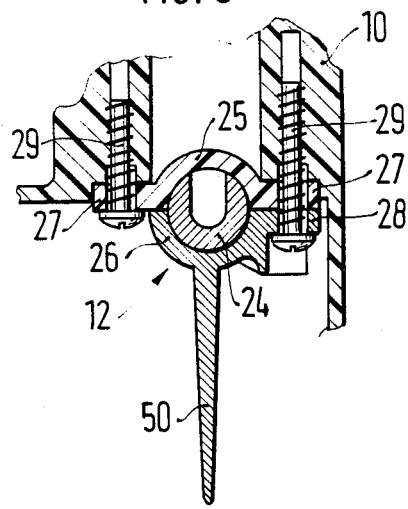
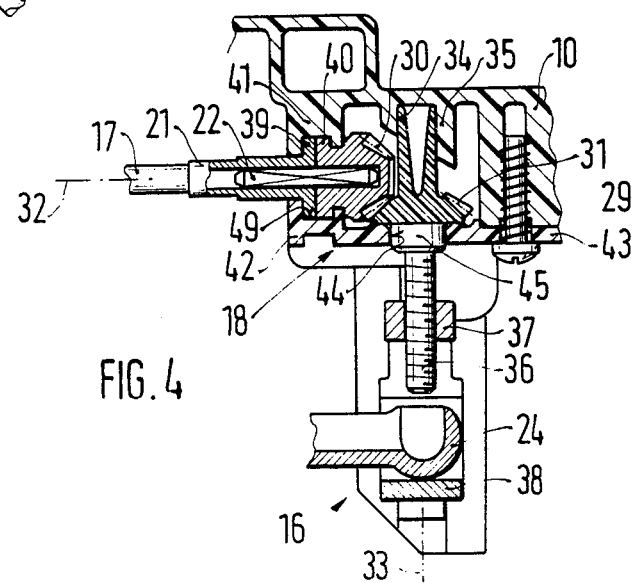

HEADLIGHT FOR POWER VEHICLE

BACKGROUND OF THE INVENTION

The present invention relates to a headlight for a power vehicle. More particularly, it relates to a headlight for a power vehicle which has a housing mounted on a body of the vehicle, and a frame which is fixed in the housing and receives a reflector, and is also turnable in a horizontal and/or vertical direction by means of an arrangement which includes a rotary part axially secured in the housing and a turning part articulately connected with the reflector.

Headlights of the above mentioned general type are known in the art. One of such headlights is disclosed, for example, in the German document DE No. 2,217,831, D2. In the construction disclosed in this reference a deflecting mechanism which connects with one another the rotary part and the turning part is formed as a long-arm lever which is articulately connected with the housing and is provided with a nut engageable therein. The turning of the lever and the rotation of the nut requires respectively a tolerance which as a whole makes difficult and lengthy the adjustment of the reflector. The above mentioned known deflecting mechanism with the one-arm lever also cannot be used when the distance between the rotary part and the turning part exceeds a certain value.

SUMMARY OF THE INVENTION

Accordingly, it is an object of the present invention to provide a headlight for a power vehicle of the above mentioned general type, which solves the above described problems with a technically simple means and is reliable in operation over the entire service life.

In keeping with these objects and with others which will become apparent herein after, one feature of the present invention resides, briefly stated, in a headlight in which the deviating mechanism is formed by a cable shaft and an angular transmission.

When the headlight is designed in accordance with the present invention, it attains the above mentioned objects. Also, the cable shaft and the angular transmission has only a small hysteresis and makes possible to provide a relatively great distance between the rotary part and the turning part and also a narrow-space deflection.

In accordance with another advantageous feature of the present invention, the angular transmission includes a bevel gear transmission with a driving bevel gear and a driven bevel gear, and both bevel gears have straight teeth. When the headlight is formed in accordance with these features, the angular transmission is easy to manufacture and reliable in operation.

Another feature of the present invention is that the axis of the driving bevel gear and the axis of the driven bevel gear intersect one another and form there between a right angle. In this case a very simple structural unit is formed.

Still another feature of the present invention is that the driving bevel gear has a pin which is supported in a pivot bearing-like sleeve of the inner wall of the housing, and a threaded pin which cooperates with a nut of the turning part. Here a space-economical support for the driving bevel gear is obtained.

In accordance with a further feature of the present invention, the inner wall of the housing and a bearing cover form a ring groove for supporting a collar of the driving bevel gear and a collar of a bush of the cable shaft and axially securing the same. With this construction the support of both bevel gears in the housing is obtained with a low number of parts and in an operationally reliable manner.

In accordance with still a further feature of the present invention the driving bevel gear has a bearing pin with an end shoulder, and in the bearing cover an opening is provided which cooperates with the bearing pins so that the end shoulder provides a predetermined arrangement of both bevel gears. With these features, the connection of the cable shaft to the rotary part on the one hand and to the driving bevel gear on the other hand is obtained.

Additional features of the present invention are that the cable shaft is connected by a form-locking plug coupling with the driving bevel gear on the one hand and the rotary part on the other hand. The rotary part has a pin, and the plug coupling has a bush with an inner profile on the cable shaft and a profile pin extending into the inner profile and either inserted into an inner profile of the driving bevel gear or projects from the pin of the rotary part and formed of one piece therewith. With these features, the connection of the cable shaft is performed in an advantageous manner.

Still another feature of the present invention is that the spherical pin of a support for the reflector is connected with the reflector, secured in a semi-trough by a bearing bracket and is spherically movable. It provides a reliable fixation of the reflector in the housing.

Finally, the semi-trough abuts against the inner wall of the housing, the bearing bracket has only one bearing gear and is mounted by a screw to one bearing gear of the semi-trough, while the bearing gear of the semi-trough with the bearing gear of the bearing bracket is mounted on the housing. Here a two-part bearing trough and its favorable mounting on the housing is proposed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a view showing a headlight of a power vehicle in accordance with the present invention, with a reflector turnable in a housing and with a vertical turning arrangement, in perspective and partially sectioned;

FIG. 2 is a view showing a rotary part of the turning arrangement in an axial section taken along the line II—II in FIG. 1 on a natural scale;

FIG. 3 is a view showing a support in a diagonal section taken along the line III—III in FIG. 1 on a natural scale; and FIG. 4 is a view showing an angular transmission in an axial section along the line IV—IV in FIG. 1 on a natural scale.

DESCRIPTION OF A PREFERRED EMBODIMENT

A headlight for a power vehicle has a housing 10 which is mounted on a not-shown vehicle body, and a frame 11 which receives a not-shown reflector and is mounted on the housing 10 by means of a support 12. The frame 11 is adjustable in a vertical direction by means of units 13 and 14. The unit 14 includes a rotary part 15 which is axially secured in the housing 10 and a turning part 16 which is articulately connected with the frame 11, as well as a deflecting mechanism which couples the rotary part with the turning part and includes a bending shaft 17 and an angular transmission 18.

The rotary part is shown in FIG. 2 and has a hand wheel 20 which projects beyond the rear side of the housing 10 and has a pin 19. The pin 19 is rotatable in the housing 10, however is axially secured. The cable shaft 17 and the rotary part 15 are connected by means of a form-locking plug connection. This plug connection includes a bush 21 with an inner opening surrounding the cable shaft 17, and a profiled pin 22 which extends into the inner opening of the bush and projects as a one-piece part from the pin 19 of the rotary part 15. A rotation of the hand wheel 20 in direction of the double arrow 23 is transmitted to the cable shaft 17.

The support 12 for the frame 11 of the reflector on the housing 10 is shown in FIG. 3 and formed as a spherical pin bearing. Its spherical pin 24 projects from the frame 11 of one-piece with the latter, while its bearing trough is formed as a spherical semi-trough 25 and a spherical bearing bracket 26.

The semi-trough 25 has two bearing gears 27, and the bearing bracket 26 has a only one bearing gear 28. One bearing gear 27 is connected by means of a head screw 29 with the inner wall of the housing 10. In the same manner the other gear 27 together with the bearing gear 28 is connected by a second head screw 29. A pin 50 projects from the bearing bracket 26 and facilitates the placement or removal of the bearing bracket 26 from the semi-trough 25.

The angular transmission is formed as a bevel gear transmission 18 as shown in FIG. 4. It has a driven bevel gear 30 and a driven bevel gear 31. Both gears have straight teeth and their axes 32 and 33 intersect one another and form therebetween a right angle. The bevel gear 31 is composed of a synthetic plastic material and has a hollow pin 34 which is supported in a sleeve 35 of the inner wall of the housing 10. The sleeve 35 acts as a circular bearing. A threaded pin 36 is formed on the bevel gear 31 of one piece therewith and extends coaxially at the opposite side of the hollow pin 34. The threaded pin 36 cooperates with a nut 37 of the turning part 16. The turning part 16 has a bearing sleeve 38 for receiving a further spherical pin 24 of the frame 11 of reflector.

The plug coupling includes a profiled pin 22 which engages into an inner profiled opening of the bevel gear 30 and the bush 21 of the cable shaft 17 of a form locking manner. The bush 21 and the bevel gear 30 abutting at its end side have annular collars 39 and 40. Both collars are supported in an annular groove 49 which is formed by a semi-shell 41 of the housing 10 and a semi-shell 42 of a bearing cover 43. Thereby the bevel gear 30 and the cable shaft are secured in the housing 10 in a rotatable and axially non-displaceable manner. The bearing cover 43 also has an opening 44. A bearing pin 45 with an end shoulder of the bevel gear 31 is axially secured in the opening 44 and thereby assumes a predetermined arrangement relative to the driving bevel gear 30.

A rotation of the hand wheel 20 in direction of the double arrow 23 [FIG. 1] actuates, via the cable shaft 17 and the angular transmission 18, a displacement of the turning part 14 in direction of a double arrow 46. Therefore, the spherical pin 24 turns the frame 11 in a horizontal direction about a substantially vertical axis 47. It goes through the spherical pin 24 of the support 12 and the turning part 48 of the unit 13 for the adjustment of the frame 11 of the reflector in a vertical direction.

It will be understood that each of the elements described above, or two or more together, may also find a useful application in other types of constructions differing from the types described above.

While the invention has been illustrated and described as embodied in a headlight for a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A headlight for a power vehicle, comprising a housing mountable on a body of a vehicle; a frame provided to support a reflector with a lamp and arranged in said housing, said frame being turnable in a horizontal and a vertical direction; means for turning said frame in the horizontal and the vertical direction and including a rotary part axially secured in said housing, a turning part articulately connectable with said frame, and a deflecting mechanism which couples said parts with one another, said deflecting mechanism including a cable shaft and an angular transmission.

2. A headlight as defined in claim 1, wherein said angular transmission is formed as a bevel gear transmission and includes a driving bevel gear and a driven bevel gear both having straight teeth.

3. A headlight as defined in claim 2, wherein said driving bevel gear has an axis, said driven bevel gear having also an axis, said axes of said bevel gears intersecting one another and enclosing a right angle there between.

4. A headlight as defined in claim 2, wherein said housing has an inner wall provided with a sleeve which serves as a pivot bearing, said turning part has a nut, said driving bevel gear having a pin which is pivotally supported in said sleeve and also a threaded pin which cooperates with said nut.

5. A headlight as defined in claim 2, wherein said housing has an inner wall; and further comprising a bearing cover, said inner wall and said bearing cover together forming a ring groove, said driving bevel gear having a collar, said bending shaft also having a collar, said collars being supported and axially secured in said ring groove.

6. A headlight as defined in claim 2; and further comprising a bearing cover having an opening, said driving bevel gear having a bearing pin with an end shoulder, said bearing pin cooperating with said opening of said bearing cover so that said end shoulder provides a predetermined arrangement of said driving and driven bevel gears relative to one another.

7. A headlight as defined in claim 2; and further comprising means for form-locking plug connection of said bending shaft with said driving bevel gear and also with said rotary part.

8. A headlight as defined in claim 7, said rotary part having a pin, said means for plug coupling including a bush with an inner profiled opening surrounding said bending shaft and also including a profiled pin which extends into said inner opening.

9. A headlight as defined in claim 1, wherein said driving bevel gear has an inner profiled opening, said profiled pin being introduced into said inner profiled opening of said driving bevel gear.

10. A headlight as defined in claim 8, wherein said profiled pin is formed as a one piece-member with said pin of said rotary part and projects from said pin of said rotary part.

11. A headlight as defined in claim 1; and further comprising a support for turnably supporting the reflector in said housing and formed as a spherical pin support having a spherical pin which is connectable with the reflector and means for supporting said spherical pin, said means for supporting said spherical pin including a semi-trough and a bearing bracket which support said spherical pin of said support so that it is spherically movable.

12. A headlight as defined in claim 11, wherein said housing has an inner wall, said semi-trough abuts against said inner wall of the housing, said bearing abutting said semi-trough and having only one bearing gear, said semi-trough having two bearing gears; and further comprising means for connecting one of said bearing gears of said semi-trough by said housing; and means for connecting the other of said bearing gears of said semi-trough and said bearing gear of said bracket with said housing.

13. A headlight as defined in claim 12, wherein each of said means for connecting includes a screw.

14. A headlight as defined in claim 11, wherein said bearing bracket has a pin projecting therefrom for facilitating placement of said bearing bracket on said semi-trough and removal of said bearing bracket from said semi-trough.

* * * * *